June 21, 1960   A. L. HERRMANN ET AL   2,941,408
FRICTION DRIVE

Filed Jan. 29, 1959   3 Sheets-Sheet 1

FIG. I

Josef Boehm,
Adolf L. Herrmann,
INVENTORS

ATTORNEYS.

June 21, 1960  A. L. HERRMANN ET AL  2,941,408
FRICTION DRIVE
Filed Jan. 29, 1959  3 Sheets-Sheet 2

Josef Boehm,
Adolf L. Herrmann,
INVENTORS
BY
ATTORNEYS.

June 21, 1960  A. L. HERRMANN ET AL  2,941,408
FRICTION DRIVE

Filed Jan. 29, 1959

Josef Boehm,
Adolf L. Herrmann,
INVENTORS

BY

ATTORNEYS

United States Patent Office 2,941,408
Patented June 21, 1960

2,941,408

FRICTION DRIVE

Adolf L. Herrmann and Josef Boehm, Huntsville, Ala., assignors to the United States of America as represented by the Secretary of the Army Filed Jan. 29, 1959, Ser. No. 790,025

9 Claims. (Cl. 74—202)

(Granted under Title 35, U.S. Code (1952), sec. 266)

The invention described herein may be manufactured and used by or for the Government for governmental purposes without the payment of any royalty thereon.

Our invention relates to a friction drive for transmission of high torques between power and load shafts and, more particularly, to such a friction drive in which the friction force increases with the load.

Large vehicles, such as missiles disposed to travel at high speeds in trajectories, require high torques for operation of control surfaces to guide the missile in the atmospheric portions of the trajectories, responsive to error signals from computers. Prompt application of the torques, and rapid reversal thereof, minimize the value of the corrections to be made responsive to the error signals.

It is an object of our invention to provide a friction drive for rapid application of high torques to a load shaft.

Another object of our invention is to provide such a friction drive disposed for rapid reversal of such torques.

A further object of our invention is to provide such a clutch in which the friction force increases with the load.

Other aims and objects of our invention will appear from the following description.

In carrying out our invention a friction drive is provided with a frame, power and load units provided with respective shafts secured to a rotating power unit and a rotatable load, a device slidable in the frame, and an operating mechanism engaging the slidable device for displacement thereof between positions of frictional engagement with the power unit for opposite rotations of the load shaft and a neutral position out of such engagement.

The slidable device is disposed for minimum displacement between the engagement positions, and the slidable device and operating mechanisms are disposed for high mechanical advantage for operation of the friction drive responsive to low force mechanisms such as solenoids.

The output shaft is in meshed relation with the slidable device for engagement position application thereto of a component of the load reaction force therebetween to increase the force of the frictional engagement in proportion to increase in the load.

The diameters of the load and transmission gears are disposed for substantial equality of the load component and the displacement force applied to the transmission device for reversing operation of the friction drive.

For more complete understanding, reference is directed to the following description and the accompanying drawing of an embodiment of our invention, in which, Figure 1 is a partly cut away perspective view of a friction drive from the power end thereof;

Figure 1:
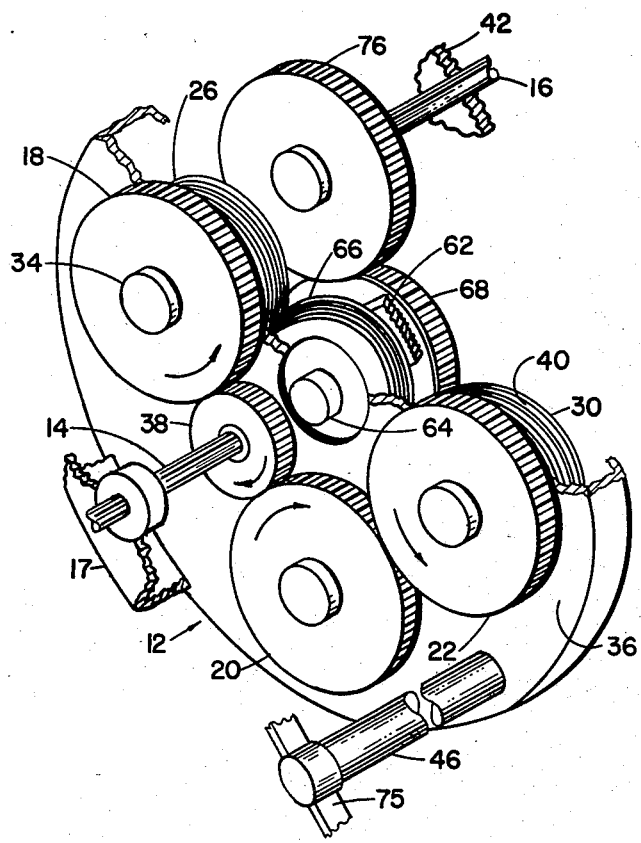
Figure 2:
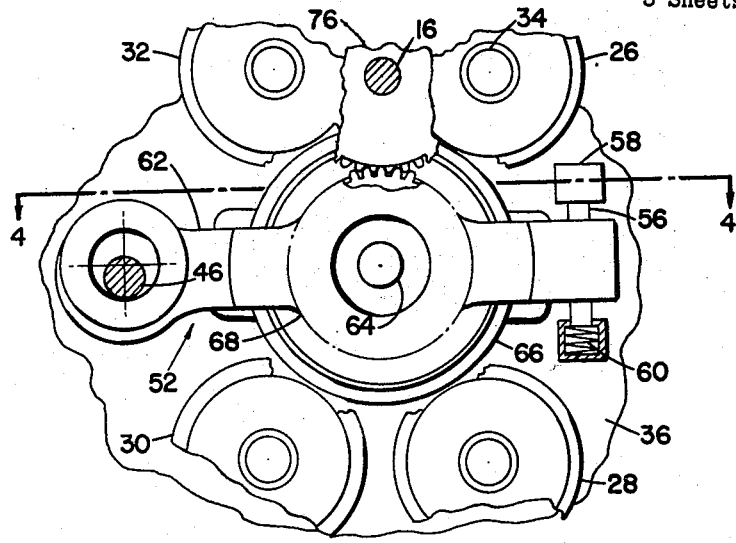
Figure 2 is a partly cut away elevation of the load end of the friction drive with the slidable device in neutral position.

Accordingly, a friction drive 12 is provided with members including power and load units with shafts 14 and 16 respectively secured to a rotating power source, and a rotatable load such as the control surface mechanism of a missile.

Power shaft 14 is journaled in a cover 17 of a frame, and gears 18, 20, 22 and a similar gear (not shown) are respectively secured to power friction wheels 26, 28, 30, and 32 by respective shafts 34 journaled between the gears and wheels in a plate 36 of the frame secured to cover 17.

Gear 18 is meshed with the similar gear. Gears 20 and 22 are meshed, and gears 18 and 20 are disposed in meshed relation with a gear 38 of the power unit secured to power shaft 14. The power friction wheels respectively include circumferential V-grooves 40.

A cover 42 of the frame is secured to plate 36 and an operating mechanism includes a shaft 46 journaled at 48 in plate 36 and cover 42. Cam 50 is secured to shaft 46 therebetween.

A slidable device 52 is provided with a cylindrical aperture 54 enclosing cam 50, and the device is disposed for slidable operation between a pair of guides 56 slidably disposed in a pair of lugs 58 secured to plate 36. Guides 56 are biased from lugs 58 by springs 60.

Slidable device 52 includes bars 61 and 62 secured together and a shaft 64 journaled therebetween is secured to a transmission wheel 66 and a gear 68, with bar 62 disposed therebetween.

Transmission wheel 66 comprises disks 70 secured in axial slidable relation to shaft 64 by a key 72 and provided with beveled edges 74 respectively corresponding to grooves 40.

Cam 50 is disposed for rotation of shaft 46 to retain wheel 66 in a neutral position just out of engagement with the power wheels, and for displacement of slidable device 52 selectively to engage wheel 66 with pairs 26, 28 and 30, 32 of the load wheels for opposite rotations of gear 68. Arms 75 are secured to shaft 46 for application of a torque thereto by means of a mechanism such as a solenoid to apply a force between the transmission wheel and the corresponding pair of the power wheels for frictional engagement therebetween to transmit a high torque to the transmission shaft. A gear 76 of the load unit is secured to load shaft 16, and the load shaft is journaled in cover 42 for continuous meshed engagement of gear 76 with gear 68.

Figure 3:
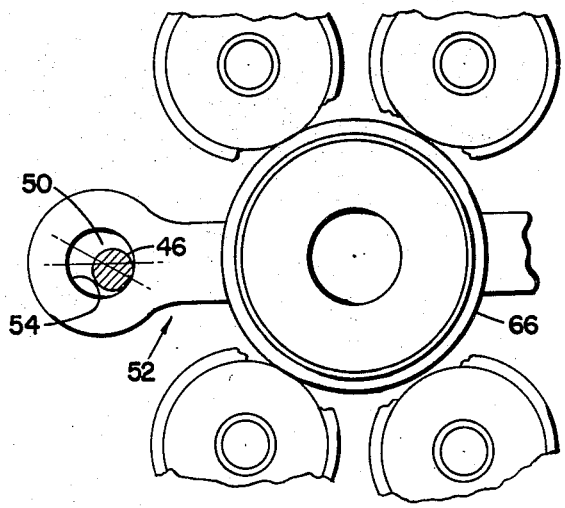
Figure 3 is an elevation similar to Figure 2 with the slidable device in engagement with one pair of the power wheels.
Figure 4:
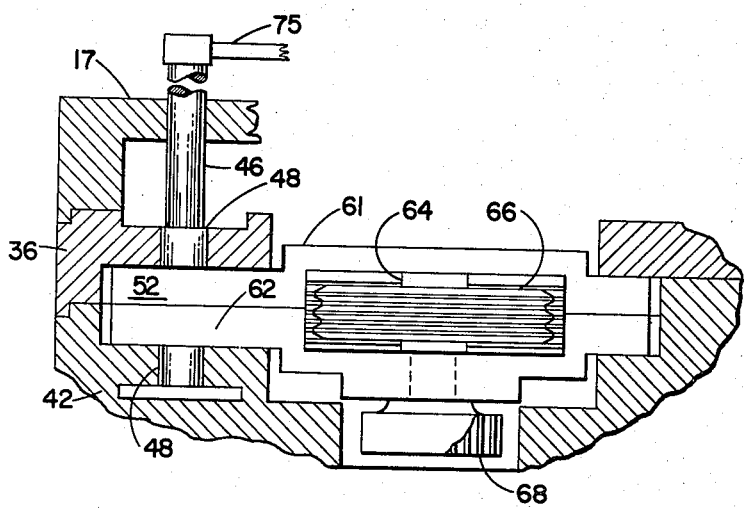
Figure 4 is a view along line 4—4 of Figure 2.
Figure 6:
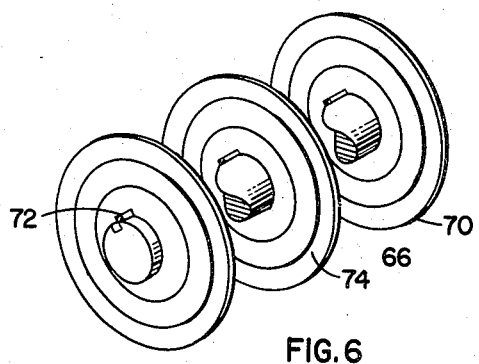
Figure 6 is an exploded view of the load wheel and shaft.
Figure 5:
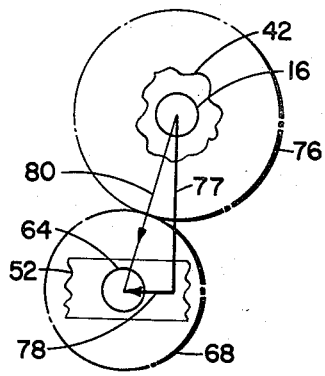
Figure 5 is a schematic view of the load and transmission gears with the slidable device in an engagement position.

The displacements of slidable device 52 between the neutral and engagement positions are limited to substantially .001 inch. In the neutral position of slidable device 52, the centers of gears 76 and 68 are disposed along line 77 and in the engagement positions (Fig. 3) an additional force equal to a component 78 of a load 80 between gears 76 and 68 is applied by shaft 64 to load wheel 66 in the direction of the displacement, to increase the friction force on the load wheel as the load is increased.

Slidable device 52 may be displaced from the neutral position by application thereto of a force merely equal to the friction forces thereon. The mechanical advantage of a solenoid operating through one inch to produce the .001 inch stroke to the engagement position would be 1000. During the displacement, transmission wheel 66 rotates responsive to inertia of the load applied to load gear 76.

Slidable device 52 and the load unit are disposed for the additional force to be substantially equal to the displacement force available for disengagement operation of friction drive 12.

*Operation*

As explained supra, gears 76 and 68 are constantly meshed and the centers thereof are disposed in line 77, in the neutral position of slidable device 52. The slidable device is selectively displaced substantially .001 inch from the neutral position thereof in opposite directions to the positions of engagement of transmission wheel 66 with wheel pairs 26, 28 and 30, 32 for corresponding rotations of load shaft 16, responsive to the opposite rotations of operating shaft 46.

The load forces between gears 76 and 68 in the engagement positions are equal as represented at 80. The component 78 of load 80 is applied to slidable device 52 in the direction to increase the friction force between transmission wheel 66 and the respective power wheel pairs. The force to return device 52 to the neutral position includes the value of component 78 for disengagement of transmission wheel 66 for the respective pairs of power wheels.

While the foregoing is a description of the preferred embodiment, the following claims are intended to include those modifications and variations that are within the spirit and scope of our invention.

We claim:

1. A friction drive comprising a frame; power and load units therein provided with respective shafts for attachment to a rotating power source and a rotatable load; a device slidable in said frame for meshed relation with said load unit; and a mechanism rotatable in said frame for displacement of said slidable device to frictional engagement with said power unit for transmission of power to said load unit, responsive to operating forces; said slidable device being disposed for increase in the force of the frictional engagement responsive to increase in the load.

2. A friction drive as in claim 1 with said power unit and rotatable mechanism disposed for selective displacement of the slidable device to a pair of positions of the frictional engagement for opposite rotations of said load shaft, and an neutral position between the engagement positions and out of the frictional engagement responsive to the operating forces, and with said load unit and slidable device disposed for application to the slidable device in the respective engagement positions of an additional force proportionate to the load.

3. A friction drive as in claim 2 with the additional force substantially equal to the component of the load in the direction of the displacement.

4. A friction drive as in claim 3 with said load unit and slidable device disposed for substantial equality of the displacement and additional forces for disengagement of said slidable device.

5. A friction drive as in claim 2 with a transmission friction wheel journaled in said transmission device and disposed in the meshed relation; and pairs of friction wheels journaled in said frame and meshed with said power shaft respectively to engage said transmission wheel for opposite rotations thereof in the engagement positions; said friction wheels being disposed for minimum value of the displacement.

6. A friction drive as in claim 5 with said slidable device including an aperture; and said operating mechanism comprising a cam engaged in said aperture and journaled in said frame; and radial arms secured to said cam for application of the operating forces thereto.

7. A friction drive as in claim 6 with said power wheels provided with circumferential grooves; said transmission wheel provided with disks having beveled rims corresponding to said grooves for the frictional engagement therewith; and said disks keyed to the shaft of said transmission wheel for adjustment of the frictional engagement for transmission of high torques to said output shaft.

8. A friction drive as in claim 5 with said slidable device and said load unit respectively provided with transmission and load gears respectively secured to the shaft of said friction wheel and said load shaft for the meshed relation; and said slidable device disposed for operation in the displacement from the neutral position line of centers of said transmission and load gears for engagement position application to said slidable device of a component of the load.

9. A friction device as in claim 8 with said slidable device disposed for the operation thereof in the direction normal to the neutral position line of centers.

References Cited in the file of this patent

UNITED STATES PATENTS

| | | |
|---|---|---|
| 329,318 | Kniesser | Oct. 27, 1885 |
| 418,297 | Storey | Dec. 31, 1889 |
| 446,927 | Richards | Feb. 24, 1891 |
| 502,245 | Bowman | July 25, 1893 |
| 651,656 | Durr | June 12, 1900 |
| 771,541 | Ericson | Oct. 4, 1904 |
| 827,204 | Bauch | July 31, 1906 |
| 833,994 | Bradshaw | Oct. 23, 1906 |